United States Patent
Yuzawa

[15] 3,659,929
[45] May 2, 1972

[54] BACK-MIRROR AND SIDE-MIRROR COMBINATION DEVICE

[72] Inventor: Masaharu Yuzawa, 10-23, 2-chome Kamiikedai, Tokyo, Japan

[22] Filed: Jan. 25, 1971

[21] Appl. No.: 109,365

[30] Foreign Application Priority Data

Feb. 28, 1970 Japan................................45/19294

[52] U.S. Cl..............................................350/307, 350/287
[51] Int. Cl........................................................G02b 5/08
[58] Field of Search..........350/286, 287, 299, 301, 302–304, 350/307

[56] References Cited

UNITED STATES PATENTS 2,534,135  12/1950  Lahr......................................350/302
2,413,894  1/1947  Sorensen................................350/307

Primary Examiner—David Schonberg
Assistant Examiner—Michael J. Tokar
Attorney—Waters, Roditi, Schwartz & Nissen

[57] ABSTRACT

The device comprises a back mirror rotationally installed within a cover body and a side-mirror of prism reflection type pivotably supported in a square box provided beneath said back-mirror cover body and having colored glass window thereon to reflect a colored image of the sideward sight whereby the driver can distinguish therethrough between both sideward and backward sights without mistake.

2 Claims, 4 Drawing Figures

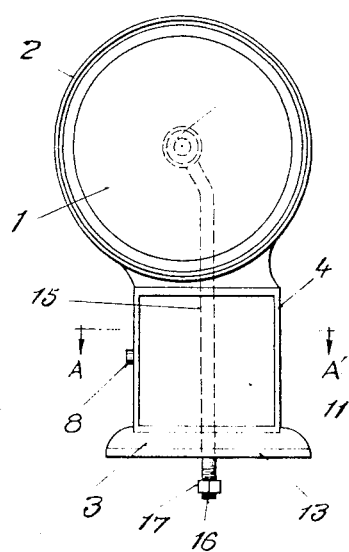
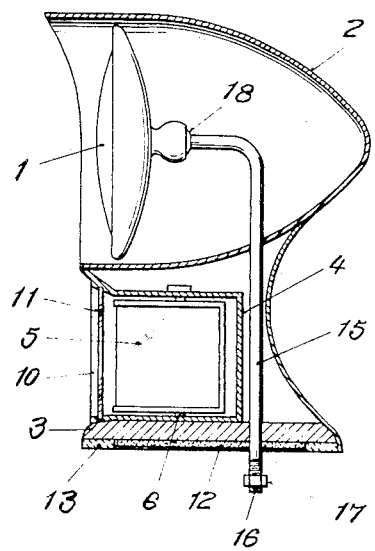
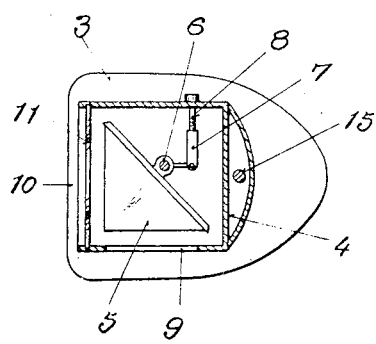
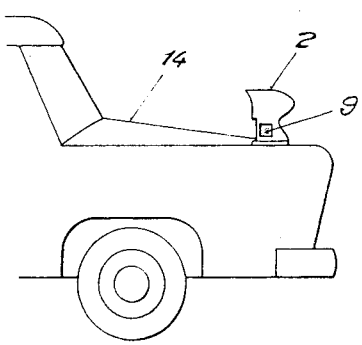

BACK-MIRROR AND SIDE-MIRROR COMBINATION DEVICE

This invention relates to a back-mirror and side-mirror combination device for a motor car.

Every motor car is necessarily equipped with a back-mirror through which the driver can confirm the condition of his backward direction easily. However, in the case of a motor car other than of cab-over the driver's seat is located some distance from the front of the car and it is therefore difficult for the driver to confirm his sideward sight from his sitting position especially at a cross road where an extensive sideward view can not be easily obtained. Accordingly, he, relying on his sense, must get his car advanced to a position where he can command his full view and such "sense driving" (so-called as it may be) may often lead to an accident against his will.

An object of the present invention is to provide a back-mirror and side-mirror combination device for a motor car which enables the driver to confirm therethrough both backward and sideward sights without mistake by the provision of a side-mirror of prism reflection type within a square box integrally provided beneath a cover within which a back mirror is rotationally received.

Another object of the present invention is to provide a back-mirror and side-mirror combination device wherein windows are provided on one or both adjoining sides thereof and a colored glass is fixed thereto whereby the sideward sight can be imaged in color and the driver can distinguish therethrough between both backward and sideward sights without mistake.

Further object of the present invention is to provide a back-mirror and side-mirror combination device wherein the angle of the side-mirror can be selectively adjusted by the provision of an adjusting screw connected to a crank mechanism.

Still further object of the present invention is to provide a back-mirror and side-mirror combination device wherein a strong magnet and a rubber packing arranged therearound are fixed at the bottom of a fixing plate of the device to accomplish a complete tight attachment of the device to a car body.

It should be noted that the word "side-mirror" used in this specification means a mirror device adopted to reflect an image of the sideward direction of a motor car and not a back-mirror which is sometimes called as a side-mirror due to the fact that the latter is installed on the front-side portion of the car body.

The present invention will now be explained in detail by way of example with reference to the accompanying drawings in which:

FIG. 1 is a vertical sectional view of a back-mirror and side-mirror combination device according to the present invention;

FIG. 2 is a side sectional view of a back and side mirror combination;

FIG. 3 is a horizontal sectional view of A—A line of a back-mirror and side-mirror combination device according to the present invention; and FIG. 4 is a side view of a back-mirror and side-mirror combination device in use according to the present invention.

As shown in FIGS. 1 to 3, a back-mirror 1 is rotationally installed within a stream-lined cover body 2. A square box 4 whose front surface is closed is provided between said cover body 2 and a fixing plate 3 with which latter the entire device is fixed to a car as hereinafter described, and a side-mirror 5 of prism reflection type is installed within said box 4 and is pivotably supported by a supporting shaft member 6. An adjusting screw 8 is connected to the rear surface of said side-mirror 5 so that the angle of said side-mirror 5 may be selectively adjusted. On both outer side surface (facing the sideway direction) and rear surface (facing the driver) of said box 4 windows 9, 10 are provided and are fixed each with a colored glass 11 so that an image of the sideward sight can be obtained in color which is clearly distinctive from that of the backward sight reflected in the back-mirror 1. And finally, a strong magnet 12 and a rubber packing 13 arranged therearound are attached to a car body 14 and a back-mirror supporting member 15 extending downwardly from a universal joint 18 through the cover body 2 and the fixing plate 13 and having a threaded end 16 is inserted into an appropriated bore provided in the front-side portion of the car body 14 and is tightly fastened thereto with a nut 17.

A back-mirror and side-mirror combination device according to the present invention is usually attached to the front-side portion of the body of a motor car and has such advantages that by the provision of a universal joint and an adjusting screw the angles of both mirrors can be selectively adopted according to the height of the driver, whether short or tall, by the provision of colored glass windows the sideward sight (or condition) can be confirmed by a colored image thereof and the driver can distinguish between both side and backward sights without any mistake which ensures him a safer driving and prevents head-on collisions or the like accidents which are often attributed to the use of the conventional back-mirror device. Furthermore, the use of a strong magnet and a rubber packing for fixing purposes ensures a perfectly tight and water proof attachment of the device to the car body.

What I claim is:

1. A rear view-mirror and side view-mirror combination characterized in that the side view-mirror is a prism reflector is pivotably supported within a square box which is integrally provided beneath the lower surface of a cover body within which a rear view mirror is freely rotationally mounted and colored glass windows are fixed on both the rear surface and the outer side surface of said box whereby an image of a sideward object field appears in color through the window glass facing the driver.

2. The rear view-mirror and side view-mirror combination according to claim 1 wherein the angles of both said rear view-mirror and sideview-mirror can be selectively adjusted manually and by side view-mirror adjusting screw connected to the side-mirror by means of a universal joint and a crank mechanism.

* * * * *